United States Patent
Lin et al.

(10) Patent No.: US 9,429,297 B2
(45) Date of Patent: Aug. 30, 2016

(54) BACKLIGHT REFRACTION LENS

(71) Applicants: Yu-Xiang Lin, New Taipei (TW);
Shuei-Tian Cai, Taichung (TW);
Lieh-Hsiung Hu, Taichung (TW)

(72) Inventors: Yu-Xiang Lin, New Taipei (TW);
Shuei-Tian Cai, Taichung (TW);
Lieh-Hsiung Hu, Taichung (TW)

(73) Assignee: Lieh-Hsiung Hu, Taichung (TW)

( * ) Notice: Subject to any disclaimer, the term of this patent is extended or adjusted under 35 U.S.C. 154(b) by 51 days.

(21) Appl. No.: 14/661,373

(22) Filed: Mar. 18, 2015

(65) Prior Publication Data
US 2016/0146428 A1    May 26, 2016

(30) Foreign Application Priority Data

Nov. 24, 2014 (TW) .............................. 103220783 U
Nov. 24, 2014 (TW) .............................. 103220784 U

(51) Int. Cl.
*F21V 5/04* (2006.01)
*F21S 8/10* (2006.01)
*G02B 3/08* (2006.01)
*G02B 19/00* (2006.01)

(52) U.S. Cl.
CPC ................. *F21V 5/04* (2013.01); *E01F 9/617* (2016.02); *F21S 48/2212* (2013.01); *F21V 5/045* (2013.01); *G02B 3/08* (2013.01); *G02B 19/0014* (2013.01); *G02B 19/0061* (2013.01)

(58) Field of Classification Search
CPC G02B 3/08; G02B 19/0061; G02B 19/0014; F21V 5/04; F21V 5/045; E01F 9/617; F21S 48/2212
See application file for complete search history.

(56) References Cited

U.S. PATENT DOCUMENTS

2013/0301138 A1\* 11/2013 Cai .......................... G09F 13/02
359/619

\* cited by examiner

*Primary Examiner* — David V Bruce
(74) *Attorney, Agent, or Firm* — Egbert Law Offices, PLLC

(57) ABSTRACT

A backlight refraction lens includes a body formed with an incident face and an emergent face, wherein the incident face has a raised periphery and an axis formed with an angle with an axis of the body, the angle, between the axis of the incident face and the axis of the body, set between 35 degrees to 65 degrees such that the ray light going into the body along an incident angle within 15-45 degrees is mostly projected from the emergent face after being refracted. The backlight refraction lens promotes the visibility and identification of objects on the outdoor kanban board when the outdoor kanban board is in a backlight condition such that the conventional LEDs are unnecessary to the outdoor kanban board that has a series of backlight refraction lens in accordance with the present invention mounted thereon.

9 Claims, 7 Drawing Sheets

BACKLIGHT REFRACTION LENS

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to a lens, and more particularly to a backlight refraction lens for being used on an outdoor board.

2. Description of Related Art Including Information Disclosed Under 37 CFR 1.97 and 37 CFR 1.98.

In our daily life, some outdoor kanban boards use LEDs for promoting their brightness and visibility at night or when the weather is not good. The LEDs are operated at night or when the weather is not good for saving power.

However, the visibility of the conventional outdoor board sometimes is low under sunshine when the conventional outdoor kanban board is in a backlit condition. Though, the problem can be solved when operating the LEDs, the LEDs needs to consume electric power. However, equipment is expensive when transforming solar to electric power for LEDs. In addition, the equipments need to be kept in good repair. It will cost a lot of money such that the conventional outdoor board with solar equipment is not widely used.

The present invention has arisen to mitigate and/or obviate the disadvantages of the conventional outdoor kanban board.

BRIEF SUMMARY OF THE INVENTION

The main objective of the present invention is to provide an improved backlight refraction lens that promotes the brightness of an outdoor kanban board under a backlight condition.

To achieve the objective, the backlight refraction lens in accordance with the present invention comprises a body formed with an incident face and an emergent face, wherein the incident face has a raised periphery and an axis formed with an angle with an axis of the body, the angle, between the axis of the incident face and the axis of the body, set between 35 degrees to 65 degrees such that the ray light going into the body along an incident angle within 15-45 degrees is mostly projected from the emergent face after being refracted. The backlight refraction lens promotes the visibility and identification of objects on the outdoor kanban board when the outdoor kanban board is in a backlight condition such that the conventional LEDs are unnecessary to the outdoor kanban board that has a series of backlight refraction lens in accordance with the present invention mounted thereon. The refracted ray light is exported from the emergent face and has a refraction angle within 10 to 30 degrees such that the refracted ray light is directed along human's visual angle when view the higher outdoor kanban board for promoting the backlight displaying effect.

Further benefits and advantages of the present invention will become apparent after a careful reading of the detailed description with appropriate reference to the accompanying drawings.

DETAILED DESCRIPTION OF THE INVENTION

Figure 1:
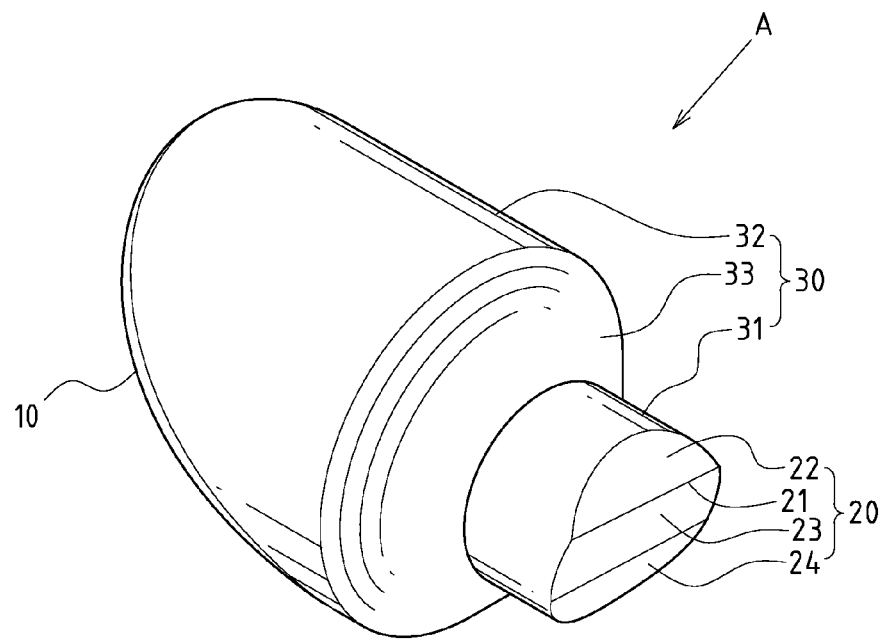
FIG. 1 is a perspective view of a backlight refraction lens in accordance with the present invention.
Figure 2:
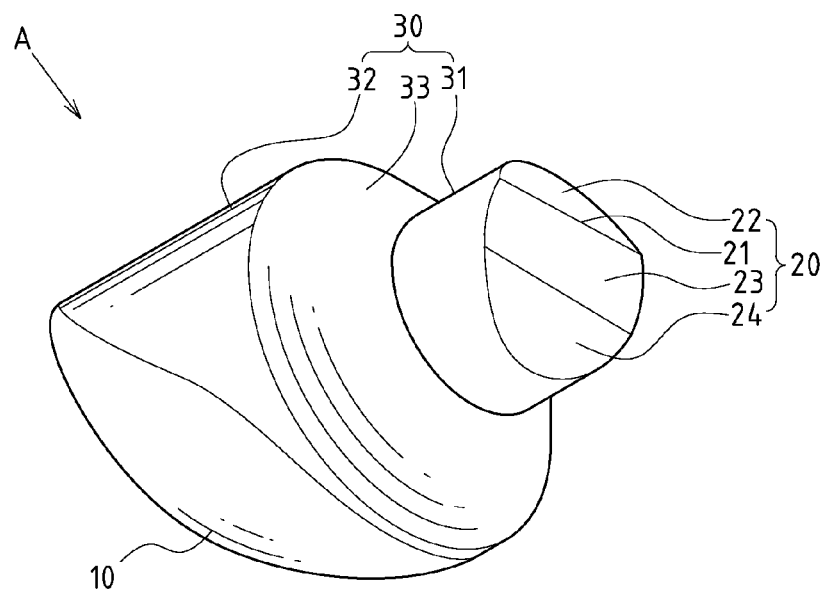
FIG. 2 is another perspective view of a backlight refraction lens in accordance with the present invention.
Figure 3:
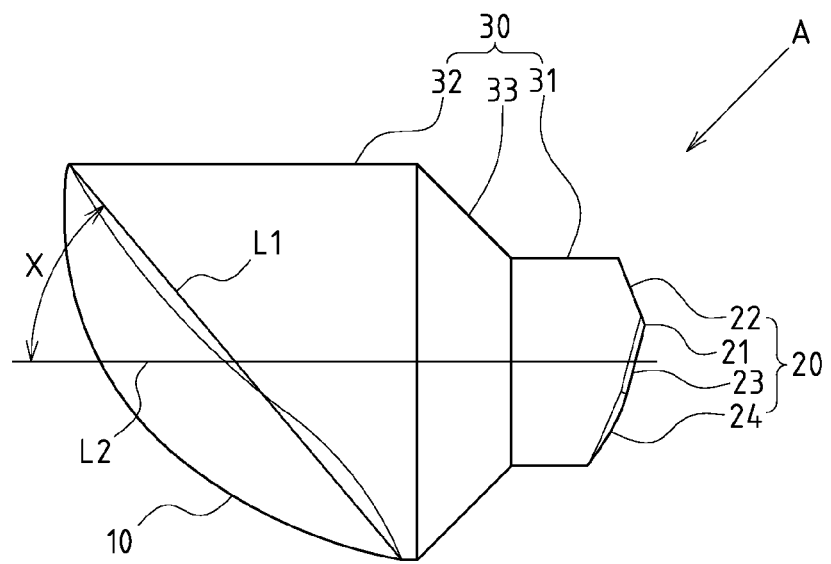
FIG. 3 is a side plan view of the backlight refraction lens in FIG. 1/2.
Figure 4:
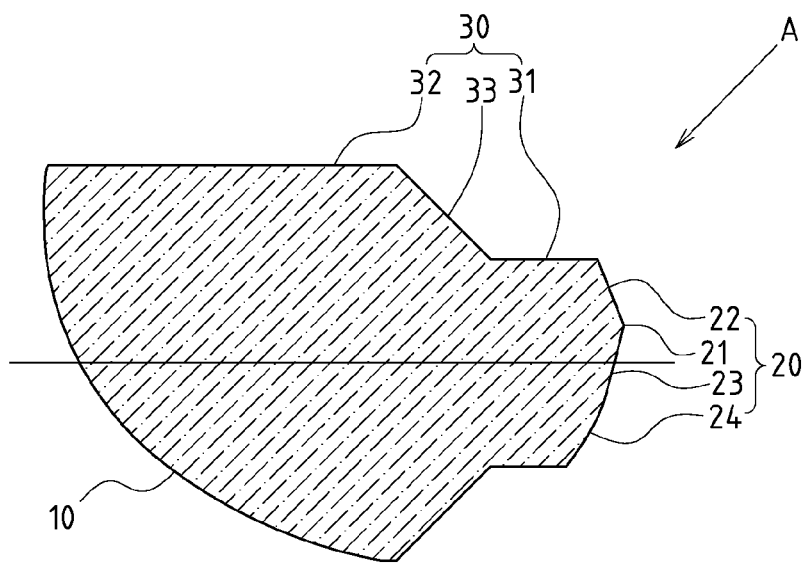
FIG. 4 is a cross-sectional view of the backlight refraction lens in FIG. 1/2.

Referring to the drawings and initially to FIGS. 1-4, a backlight refraction lens A in accordance with the present invention comprises a body 30 formed with an incident face 10 and an emergent face 20, wherein the incident face 10 has a raised periphery and an axis L1 formed with an angle X with an axis L2 of the body 30. The angle X is set between 35 degrees to 65 degrees such that the ray light going into the body 30 along an incident angle within 15-45 degrees is mostly projected from the emergent face 20 after being refracted.

The body 30 is sequentially divided into an emergent portion 31, a tapered portion 33 and an incident portion 32, wherein the incident portion 32 has a diameter greater than that of the emergent portion 31.

The emergent face 20 is sequentially divided into an upper fraction portion 22, a middle refraction portion 23 and a lower refraction portion 24, wherein a ridgeline 21 is formed between the upper refraction portion 22 and the middle refraction portion 23. The upper refraction portion 22 is upward inclined, and the middle refraction portion 23 and the lower refraction portion 24 are downward inclined for refracting the ray light having a incident angle from 15 to 45 degrees and having a refraction angle within 10 and 30 degrees, as the arrow shown in the FIGS. 5 to 7.

Figure 5:
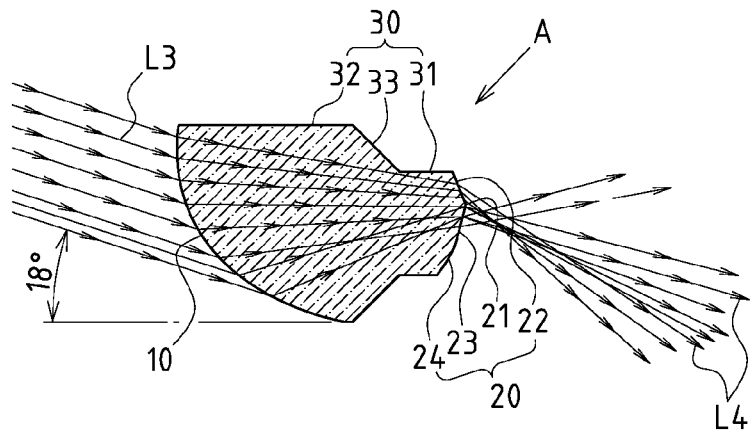
FIG. 5 is a first operational view of the backlight refraction lens in FIG. 1/2.
Figure 6:
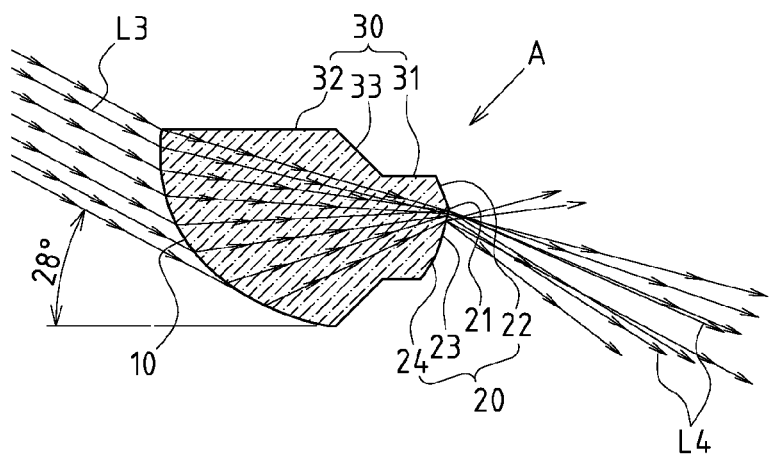
FIG. 6 is a second operational schematic view of the backlight refraction lens in FIG. 1/2.
Figure 7:
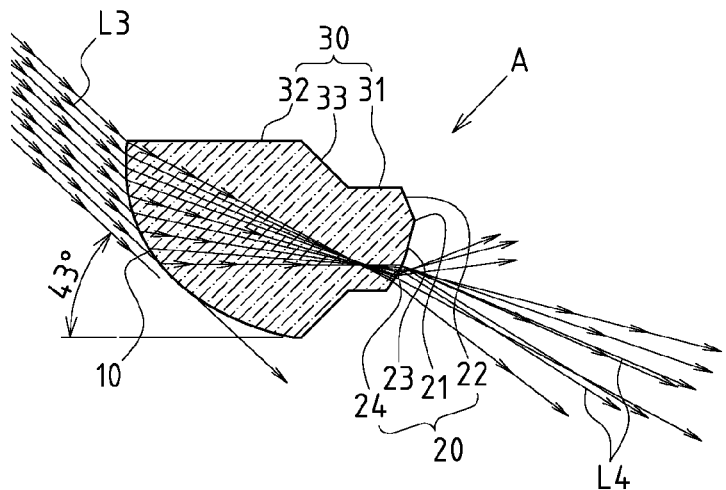
FIG. 7 is a third operational view of the backlight refraction lens in FIG. 1/2.

As shown in FIG. 5, the ray light L3, going into the body 30, has an incident angle being 18 degrees and is refracted by the incident face 10 toward two opposite sides of the ridgeline 21. The refracted ray light is exported from the upper refraction portion 22 and the middle refraction portion 23 and has a refraction angle within 10 and 30 degrees, as the arrows L4 shown in FIG. 5. With reference to FIG. 6, the ray light L3, going into the body 30, has an incident angle being 28 degrees and is refracted by the incident face 10 toward the middle refraction portion 23. The refracted ray light is exported from the middle refraction portion 23 and has a refraction angle within 10 to 30 degrees, as the arrows L4 shown in FIG. 6. With reference to FIG. 7, the ray light L3, going into the body 30, has an incident angle being 43 degrees and is refracted by the incident face 10 toward the lower refraction portion 24. The refracted ray light is exported from the lower refraction portion 24 and has a refraction angle within 10 and 30 degrees, as the arrows L4 shown in FIG. 7. As describe above, the ray light has an incident angle within 15 to 45 degrees, accordingly, the refracted ray light inevitably has a refraction angle within 10 to 30 degrees. The reason why the refraction angle is set between 10 to 30 degrees is that the backlight refraction lens A in accordance with the present invention is usually disposed on outdoor kanban board 40, such as a traffic sign, a billboard, a signboard and the like for promoting brightness. The objects 41 on the outdoor kanban board 40 usually have a height higher than that of human's eyes such that the refracted ray light, having the refraction angle within 10 to 30 degrees, is directed along human's visual angle when view the higher outdoor kanban board 40. As a result, the backlight refraction lens A promotes the visibility and identification of the objects 41 on the outdoor kanban board 40 when the outdoor kanban board 40 is in a backlight condition such that the conventional LEDs are unnecessary to the outdoor kanban board 40 that has a series of backlight refraction lens A in accordance with the present invention mounted thereon.

Figure 8:
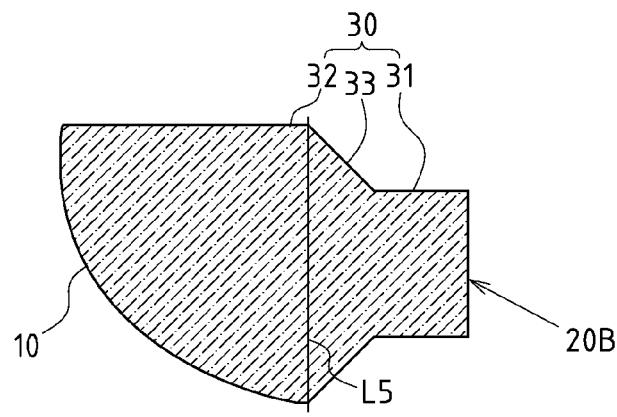
FIG. 8 is a cross-sectional view of a second embodiment of the backlight refraction lens in accordance with the present invention.
Figure 9:
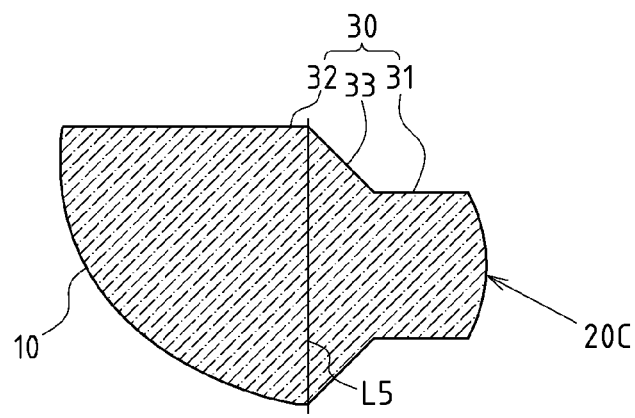
FIG. 9 is a cross-sectional view of a third embodiment of the backlight refraction lens in accordance with the present invention.
Figure 10:
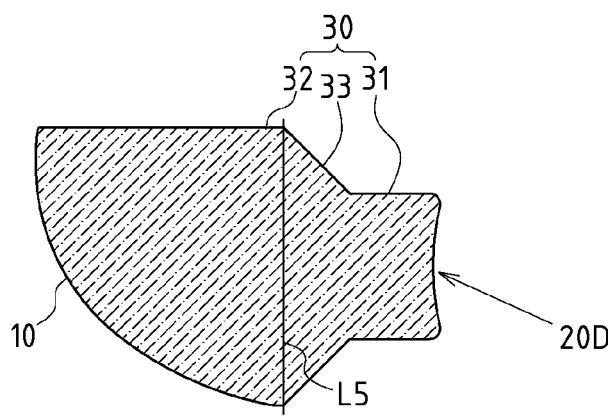
FIG. 10 is a cross-sectional view of a fourth embodiment of the backlight refraction lens in accordance with the present invention.
Figure 11:
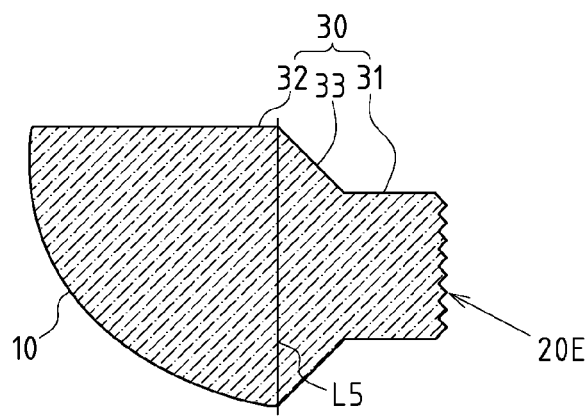
FIG. 11 is a cross-sectional view of a fifth embodiment of the backlight refraction lens in accordance with the present invention.

With reference to FIG. 8, the side contour of the emergent face 20B relative to an abutment L5 between the incident portion 32 and the tapered portion 33 is flat. With reference to FIG. 9, the side contour of the emergent face 20C relative to the abutment L5 between the incident portion 32 and the tapered portion 33 is raised. With reference to FIG. 10, the side contour of the emergent face 20D relative to the abutment L5 between the incident portion 32 and the tapered portion 33 is concave. With reference to FIG. 11, the side contour of the emergent face 20E relative to an abutment L5 between the incident portion 32 and the tapered portion 33 is teethed. The refraction angle of the backlight refraction lenses 20B, 20C, 20D and 20E in FIGS. 8 to 11, approach to the axis of the body 30.

Figure 12:
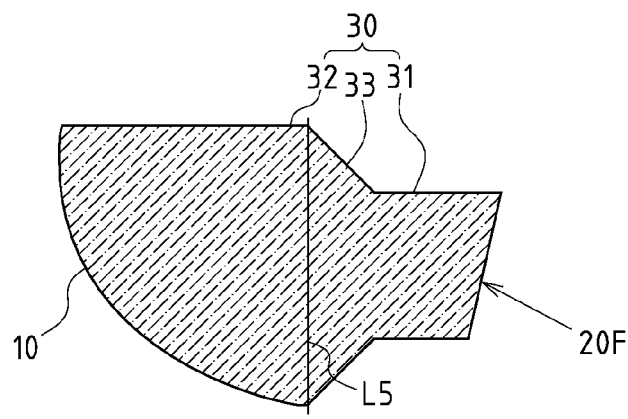
FIG. 12 is a cross-sectional view of a sixth embodiment of the backlight refraction lens in accordance with the present invention.
Figure 13:
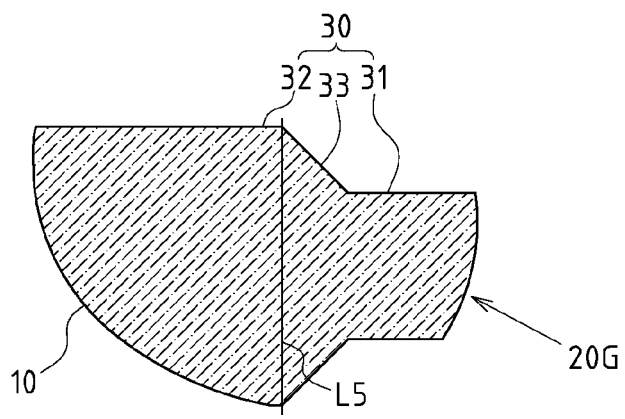
FIG. 13 is a cross-sectional view of a seventh embodiment of the backlight refraction lens in accordance with the present invention.
Figure 14:
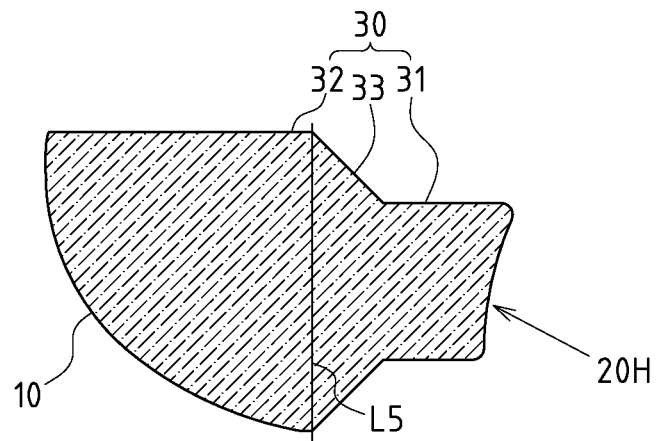
FIG. 14 is a cross-sectional view of an eighth embodiment of the backlight refraction lens in accordance with the present invention.

With reference to FIG. 12, the side contour of the emergent face 20F relative to the abutment L5 between the incident portion 32 and the tapered portion 33 is inclined. With reference to FIG. 13, the side contour of the emergent face 20G is raised relative to that of the emergent face 20F in FIG. 12. With reference to FIG. 14, the side contour of the emergent face 20H is concave relative to that of the emergent face 20F in FIG. 12. The refraction angle of the backlight refraction lenses 20F, 20G, and 20H in FIGS. 12 to 14, is similar to that of the backlight refraction lens 20 as shown in FIGS. 1 to 4.

Figure 15:
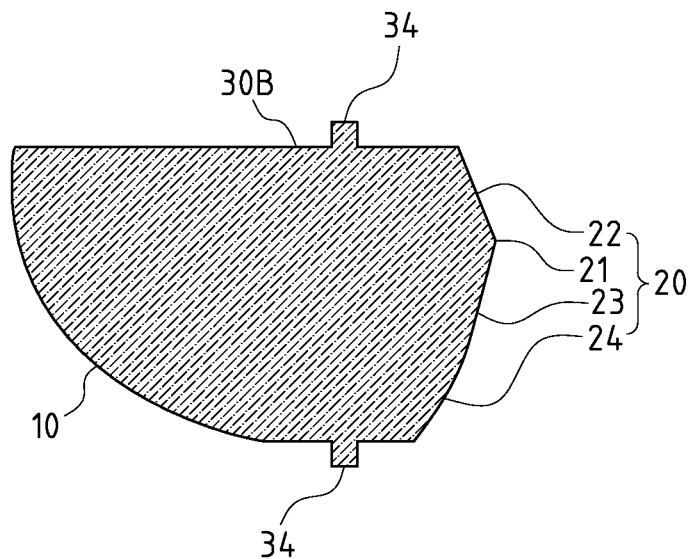
FIG. 15 is a cross-sectional view of a ninth embodiment of the backlight refraction lens in accordance with the present invention.

With reference to FIG. 15 that shows a ninth embodiment of the backlight refraction lens in accordance with the present invention, in this embodiment, the body 30B is a cylinder and has an annular rib 34 extending therefrom for easily assembling the body 30B.

Figure 16:
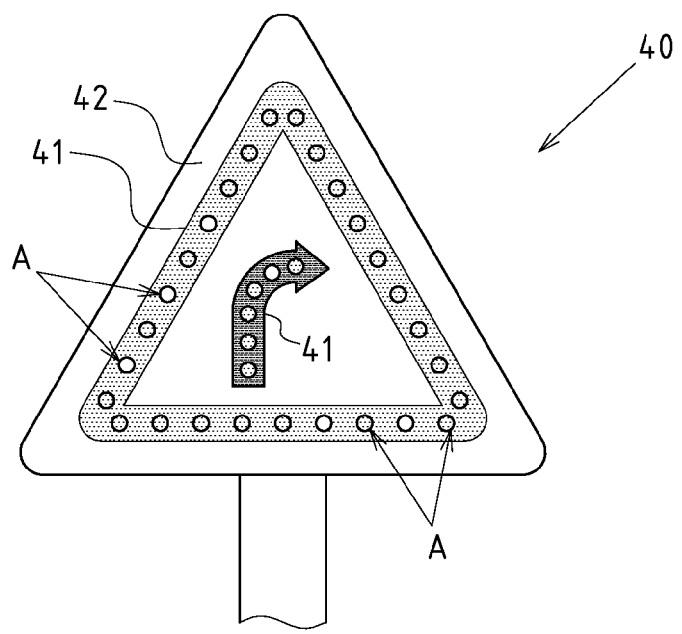
FIG. 16 is a schematic view of the backlight refraction lens in accordance with the present invention.
Figure 17:
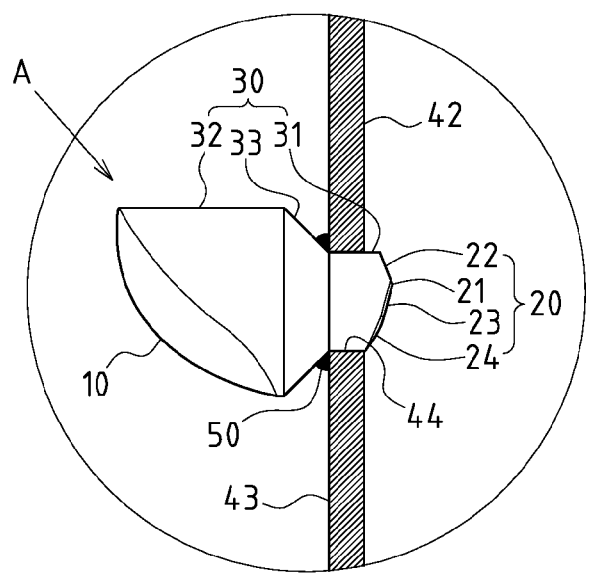
FIG. 17 is a partially cross-sectional view of FIG. 16.

With reference to FIGS. 16 and 17, there are multiple backlight refraction lenses A mounted onto an outdoor kanban board 40, wherein the outdoor kanban board 40 is a traffic sign. The outdoor kanban board 40 includes a front panel 42 and a rear panel 43, wherein object 41 is disposed on the front panel 42 and the backlight refraction lenses A are arranged along the objects 41. Multiple through holes 44 are defined in the outdoor kanban board 40, wherein the emergent portion 31 of each of the multiple backlight refraction lenses A are respectively received in a corresponding one of the through holes 44 and each emergent portion 31 extends through the outdoor kanban board 40.

With reference to FIG. 17, there is glue 50 provided to a gap between the tapered portion 33 of each of the bodies 30 and the rear panel 43 of the outdoor kanban board 40 for securing the backlight refraction lenses A.

As described above, the angle X, between the axis of the incident face and that of the body 30, is set between 35 degrees to 65 degrees such that the ray light going into the body 30 along an incident angle within 15-45 degrees is mostly projected from the emergent face 20 after being refracted. As a result, the backlight refraction lens A promotes the visibility and identification of the objects 41 on the outdoor kanban board 40 when the outdoor kanban board 40 is in a backlight condition such that the conventional LEDs are unnecessary to the outdoor kanban board 40 that has a series of backlight refraction lens A in accordance with the present invention mounted thereon.

In addition, the ray light is collected for promoting brightness after being refracted through the body 30 due to the emergent portion 31 and the incident portion 32 of each of the bodies 30.

Furthermore, the refracted ray light is exported from the emergent face 20 and has a refraction angle within 10 to 30 degrees such that the refracted ray light is directed along human's visual angle when view the higher outdoor kanban board 40 for promoting the backlight displaying effect.

Although the invention has been explained in relation to its preferred embodiment, it is to be understood that many other possible modifications and variations can be made without departing from the spirit and scope of the invention as hereinafter claimed.

We claim:

1. A backlight refraction lens comprising a body formed with an incident face and an emergent face, wherein the incident face has a raised periphery and an axis formed with an angle with an axis of the body, the angle, between the axis of the incident face and the axis of the body, set between 35 degrees to 65 degrees such that the ray light going into the body along an incident angle within 15-45 degrees is mostly projected from the emergent face after being refracted.

2. The backlight refraction lens as claimed in claim 1, wherein the body is sequentially divided into an emergent portion, a tapered portion and an incident portion, wherein the incident portion has a diameter greater than that of the emergent portion such that the ray light is collected for promoting brightness after being refracted through the body.

3. The backlight refraction lens as claimed in claim 1, wherein the emergent face is sequentially divided into an upper fraction portion, a middle refraction portion and a lower refraction portion, wherein a ridgeline is formed between the upper refraction portion and the middle refraction portion, the upper refraction portion being upward inclined, and the middle refraction portion and the lower refraction portion being downward inclined for refracting the ray light having a incident angle from 15 to 45 degrees and having a refraction angle within 10 and 30 degrees.

4. The backlight refraction lens as claimed in claim 2, wherein the emergent face is sequentially divided into an upper fraction portion, a middle refraction portion and a lower refraction portion, wherein a ridgeline is formed between the upper refraction portion and the middle refraction portion, the upper refraction portion being upward inclined, and the middle refraction portion and the lower refraction portion being downward inclined for refracting the ray light having a incident angle from 15 to 45 degrees and having a refraction angle within 10 and 30 degrees.

5. The backlight refraction lens as claimed in claim 2, wherein the emergent face is parallel to an abutment between the incident portion and the tapered portion, the emergent face having a contour selective from a group consisted of flat, concave, raised and teethed.

6. The backlight refraction lens as claimed in claim 2, wherein the emergent face is inclined to an abutment between the incident portion and the tapered portion, the emergent face having a contour selective from a group consisted of flat, concave, raised and teethed.

7. The backlight refraction lens as claimed in claim 4, wherein multiple body are mounted onto an outdoor kanban board, the outdoor kanban board including a front panel and a rear panel, wherein objects are disposed on the front panel and the bodies are arranged along the objects, multiple through holes defined in the outdoor kanban board, wherein the emergent portion of each of the multiple bodies are respectively received in a corresponding one of the through holes and each emergent portion extends through the outdoor kanban board.

8. The backlight refraction lens as claimed in claim 5, wherein multiple body are mounted onto an outdoor kanban board, the outdoor kanban board including a front panel and a rear panel, wherein objects are disposed on the front panel and the bodies are arranged along the objects, multiple through holes defined in the outdoor kanban board, wherein the emergent portion of each of the multiple bodies are respectively received in a corresponding one of the through holes and each emergent portion extends through the outdoor kanban board.

9. The backlight refraction lens as claimed in claim 6, wherein multiple body are mounted onto an outdoor kanban board, the outdoor kanban board including a front panel and a rear panel, wherein objects are disposed on the front panel and the bodies are arranged along the objects, multiple through holes defined in the outdoor kanban board, wherein the emergent portion of each of the multiple bodies are respectively received in a corresponding one of the through holes and each emergent portion extends through the outdoor kanban board.

* * * * *